United States Patent Office 3,378,749
Patented Apr. 16, 1968

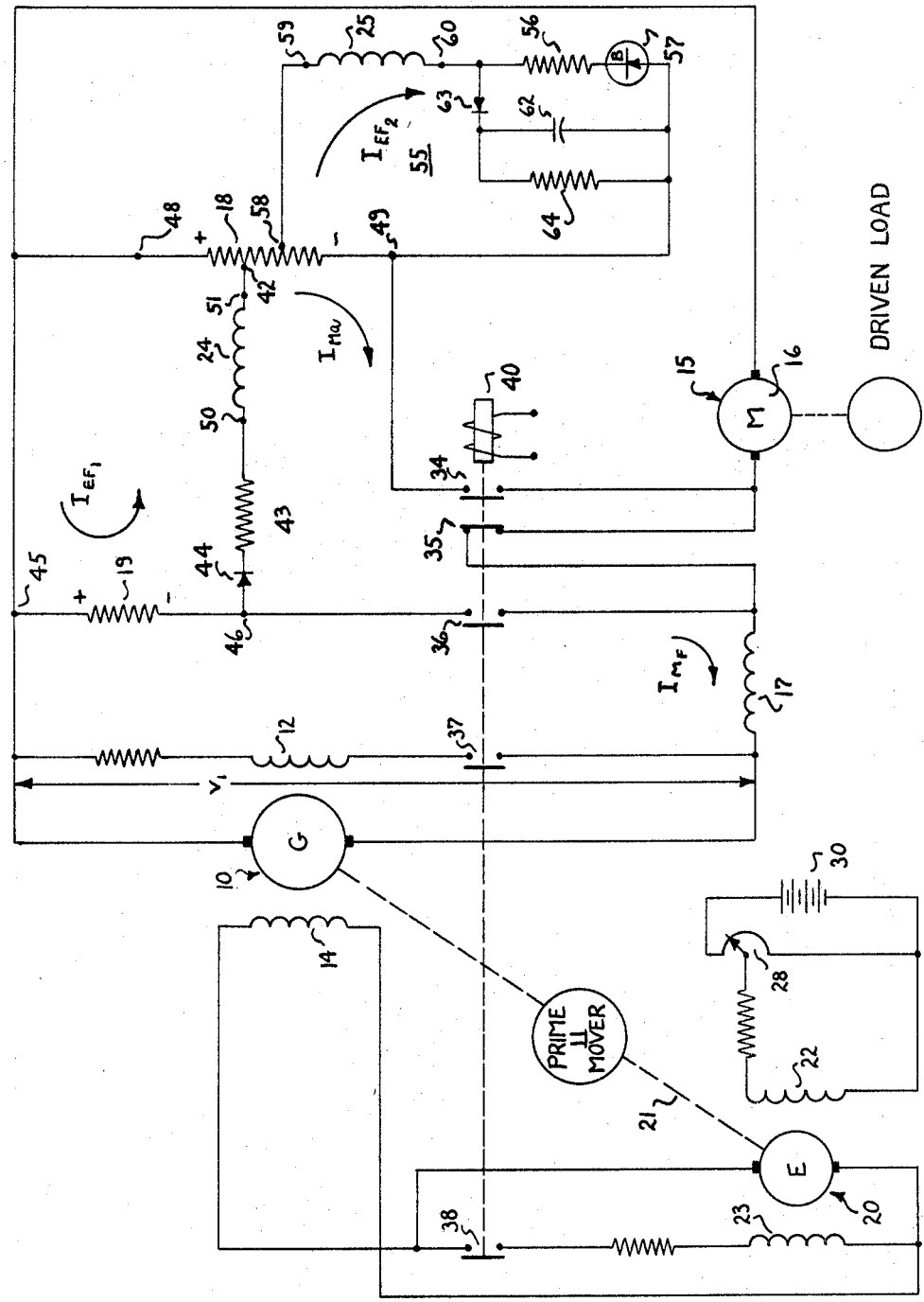

3,378,749
DYNAMIC BRAKING EXCITATION CONTROL SYSTEM FOR DYNAMOELECTRIC MACHINES
Clarence V. Cunningham, Erie, Pa., assignor to General Electric Company, a corporation of New York
Filed Apr. 17, 1964, Ser. No. 360,554
5 Claims. (Cl. 318—381)

ABSTRACT OF THE DISCLOSURE

A dynamic braking system wherein the output of a generator is connected to provide field excitation for a motor having its armature connected to a braking resistance features a regulating circuit for limiting motor armature current including an independent voltage reference with a shunt capacitance to provide a transient current by-pass path allowing energization of the motor field excitation control when a voltage derived from armature current changes.

---

This invention relates to excitation control systems for dynamoelectric machines and more particularly to a regulation means therefor for limiting the armature current of such machines to a predetermined maximum value. While this invention is subject to a wide range of applications wherein the regulation or control of the excitation of the dynamoelectric machine is desired, it is especially suited for use in dynamic braking systems for direct current electric motors and more particularly for self-powered vehicles such as diesel electric off-highway type vehicles and locomotives and will be particularly described in that connection.

One of the most advantageous features of diesel-electric vehicles utilizing traction motors of the direct current type is the availability of electric braking with the resulting reduction in mechanical brake wear. Electric braking, or dynamic braking as it is customarily referred to, is usually accomplished by connecting the armatures of the motors in a loop circuit with suitable braking resistance to provide for the dissipation of the power generated by the motors operating as generators; excitation during such dynamic braking being provided by connecting the motor fields for separate excitation from the generator. Thus, the motors act as separately excited generators with the prime mover being the energy of the load which the motors were previously driving. During dynamic braking the output of the motor fed into the fixed braking resistance varies widely for a given excitation throughout the range of vehicle speed at which dynamic braking is employed. Accordingly, a limit has been placed on the braking horsepower that could be obtained in order to prevent damage to the motors through overheating, flashover, or in burn-out of the braking resistance. Heretofore, this protection has been dependent upon the adjustment of the control excitations for a high generator speed which required that the engine be run at high speed during dynamic braking.

It is often desirable during the dynamic braking cycle, however, to operate the generator at a lower speed than during the power cycle. For example, it is psychologically objectionable from the operator's standpoint to actuate the dynamic braking control, such as by depressing the brake pedal of an off-highway vehicle, for example, and have the diesel engine race up to top speed. Accordingly, such prior art control systems have not been entirely satisfactory since the effect of the high engine speed was often to discourage operators from using dynamic braking thereby losing the very important advantage of the direct current motors for retarding speed without mechanical brake wear.

It is an object of this invention, therefore, to provide a dynamic braking control system which substantially overcomes one or more of the prior art disadvantages.

It is another object of this invention to provide a dynamic braking control system which obviates the need to operate the generator at high speed in order to protect the system during rapid changes from power to dynamic braking.

It is still another object of this invention to provide a dynamic braking control system wherein the motor armature current is suitably limited during dynamic braking even though the system supplying field excitation to the motor tends to supply excessive field current.

Briefly stated, in accordance with one aspect of this invention, a dynamic braking control system is provided wherein the control excitation adjustments to limit the braking horsepower which may be obtained are made for a low generator speed and means are provided for limiting the motor armature current to a permissible value during the time the change from propulsion to dynamic braking is taking place. That is, the braking horsepower is suitably limited during the time the generator speed is changing from the higher to the lower speed. In one aspect, this is provided by the provision of means for deriving a signal responsive to motor armature current and utilizing the derived signal to modulate the excitation of the generator, or of an exciter supplying generator excitation, whenever the derived signal is changing or exceeds a predetermined value as established by an independent reference voltage.

The novel features which are believed characteristic of this invention are set forth with particularity in the appended claims. The invention itself, however, together with further objects and advantages thereof, may best be understood by reference to the following description taken in conjunction with the accompanying drawing in which:

FIG. 1 is a schematic diagram of the dynamic braking control system in accordance with this invention.

Referring now to FIG. 1, there is shown a direct current generator 10 mechanically driven by a suitable prime mover 11, which may be, for example, a diesel engine. Generator 10 is provided with a first field 12 and a second, separately excited, shunt field 14. Generator 10 is arranged, during motoring, to energize one or more motors which are in turn connected to drive a load. For example, generator 10 may be arranged to drive the traction motors of a vehicle which motors are connected to drive the vehicle wheels. For simplicity, only one such motor is shown at 15 and is provided with an armature 16 and a field exciting winding 17. During dynamic braking the armature 16 of motor 15 is connected in a loop circuit with a suitable braking resistance 18 and field exciting winding 17 is connected for energization by generator 10 through a suitable field resistance 19.

The generator field 14 is arranged for excitation by a suitable exciter 20, which is also driven by prime mover 11 through the mechanical connection 21. Exciter 20 is provided with field windings 22, 23 and 24. As in known dynamic braking control systems, winding 22 is employed to provide the main field with windings 23 and 24 being utilized in known manner during dynamic braking as differential field windings. In accordance with the present invention, exciter 20 is also provided with an additional field winding 25, the function and operation of which will be described in detail hereinafter. Moreover, for convenience and simplicity of description, exciter field windings 22, 23, 24 and 25 are shown at various different locations of the circuit rather than all being shown directly associated with exciter 20.

Conveniently, the system may be arranged so that exciter field windings 22, 23, 24 and 25 are aiding with respect to each other during the power cycle while exciter fields 23, 24 and 25 are connected as differential fields with respect to field 22 during the dynamic braking cycle. Again, for simplicity, however, exciter field winding 22 is shown as providing the main, or battery field, with exciter field windings 23, 24 and 25 shown only as providing differential fields and being employed only during dynamic braking. Accordingly, exciter field winding 22 is arranged for excitation from an external source, shown as potentiometer 28 connected across a source of potential, shown as the battery 30. The exciter field winding 25 is utilized in accordance with this invention to limit the motor armature current during dynamic braking even though the system supplying field excitation to the motor tends to supply excessive field current thereto; exciter field windings 23 and 24 being utilized, respectively, in known manner to (1) help prevent an unwanted surge of dynamic braking when switching from power to dynamic braking and (2) to limit the motor armature current to some maximum value over the entire operating speed range of the motors.

For example, since during dynamic braking, generator 10 is required to supply power to excite only the motor field windings, generator field winding 12 is connected as a differential field across the output of the generator and exciter field winding 23 is connected as a differential field across the output of the exciter. This insertion of the generator and exciter differential fields reduces the excitation of both generator 10 and exciter 20 to very rapidly reduce the output of generator 10 and prevent an unwanted surge of dynamic braking when transferring from power to brake. For example, the greater the output voltage $V_1$ of generator 10 when the dynamic braking circuits are set up, the greater is the current in generator field winding 12 to thereby produce a greater flux in opposition to the flux produced by the current in generator field winding 14. Also at the same time the output of exciter 20 is reduced, by action of differential field 23 tending also to reduce the excitation of generator 10.

This dynamic braking connection is shown schematically as being accomplished by means of contacts 34, 35, 36, 37 and 38 which are operative, respectively, to:

(a) connect braking resistance 18 across motor armature 16,
(b) open the circuit from motor armature 16 to generator 10,
(c) connect motor field winding 17 for energization from generator 10 through field resistance 19,
(d) connect differential field 12 across generator 10,
(e) and connect differential field 23 across exciter 20.

The contacts 34–38 may be actuated in any suitable manner such as by the contactor coil 40 which is energized from a source (not shown) responsive to operation of the operator's dynamic brake control, which may be, for example, a brake pedal or the locomotive operator's controller.

Since the motor armature current during dynamic braking should be limited to some maximum value over the entire operating speed range of the motor, means are provided to reduce the motor field current due to the output voltage $V_1$ of generator 10 at high motor speeds since less field excitation is required for a given generated voltage at high speeds than at low speeds.

This is accomplished by the provision of exciter field winding 24. Exciter field winding 24 is connected between a tap 42 on braking resistance 18 through a resistance 43 and a diode 44 to the bottom terminal 46 of field resistance 19. The motor field current $I_{mf}$ flowing through field resistance 19 causes a potential drop thereacross with the terminal 45 positive and terminal 46 negative. Also the motor armature current $I_{ma}$ flowing through braking resistance 18 causes a potential drop thereacross with the terminal 48 positive and the terminal 49 negative. The tap 42 on braking resistance 18 allows a portion of the total potential drop across resistance 18 to be utilized to control the flow of current in exciter field winding 24. Thus, if the potential drop across field resistance 19 is greater than the potential drop between terminal 48 and tap 42 on resistance 18, no current will flow in exciter field winding 24 because it is blocked by the diode 44. When the motor armature current $I_{ma}$ is excessive, however, the potential drop between terminal 48 and the tap 42 of braking resistance 18 is greater than the potential drop across field resistance 19 and a current $I_{ef_1}$ flows through diode 44, adjustment resistance 43, exciter field winding 24, through braking resistance 18 from tap 42 to terminal 48, and back to terminal 45 of field resistance 19. The current in exciter field winding 24 from terminals 50 to 51 thereof produces a flux in exciter 20 which is in opposition to the flux produced therein by the current in main exciter winding 22 to thereby reduce the output of exciter 20 and hence the output voltage of generator 10. The motor armature current is, therefore, limited at high motor speeds by the regulating effect of exciter field winding 24.

The regulating effect of exciter field winding 24 is dependent upon the reference voltage provided by the potential drop across field resistance 19. This reference is valid, however, only as long as the speed of generator 10 is that for which all control excitation settings were made. If the speed of generator 10 is greater than expected, however, the greater motor field current $I_{mf}$ causes a larger potential drop across field resistance 19. As a result, greater motor armature current $I_{ma}$ is required from terminal 48 to tap 42 to provide a potential drop to counterbalance the potential drop across field resistance 19 before current $I_{ef_1}$ will flow in exciter field winding 24 to produce the opposing flux in exciter 20 and provide the desired regulation. This greater motor armature current may be sufficient to result in damage to the motor through overheating, flashover, or in burn-out of the braking resistance. Accordingly, in the past, it has been necessary to make the control excitation settings for the highest generator operating speed. Thus, it was required to run the prime mover at top speed during dynamic braking in order to provide the necessary protection for the system. As stated previously, this was very undesirable especially in off-highway type vehicles, for example, since when the operator stepped on the brake pedal to actuate the dynamic braking circuits the engine was required to race up to top speed.

In accordance with this invention, therefore, means are provided to limit the motor armature current during dynamic braking even though the system supplying field excitation to the motor tends to supply excessive field current thereto. This allows the control excitation settings for dynamic braking to be made for a low generator speed and at the same time provide protection for the system from excessive motor armature currents during the time the generator is going from the higher to the lower speed.

To this end, the system is provided with an additional regulating circuit, designated generally at 55, for regulating the flow of current in the additional exciter field winding 25, which current is operative to produce a flux in exciter 20 which is in opposition to the flux of main exciter field winding 22. Regulating circuit 55 includes the exciter field winding 25 connected in a loop circuit with a resistance 56 and an independent reference voltage between the tap 58 and the terminal 49 of braking resistance 18. The potential drop between tap 58 and terminal 49 is proportional to the motor armature current since it is caused by the flow of motor armature current in resistance 18. The independent voltage reference is conveniently provided by a suitable voltage reference device, shown as the breakdown diode 57. Alternatively, the voltage reference may be provided by a suitable battery, separate direct current machine or other suitable means arranged to allow current flow in exciter field winding 25 only in a direction from terminal 59 to 60 thereof. Regulating circuit 55 is also provided with means for providing a transient current by-pass path around the reference voltage, shown as being provided by the capacitance 62. A diode 63 is provided to prevent discharge of capacitance 62 through exciter field winding 25 which would allow current flow therein in an unwanted direction. A resistance 64 shunting capacitance 62 is provided to allow for discharge thereof through the leakage path provided thereby.

Regulating circuit 55 is effective when the change from power to dynamic braking is taking place or, during dynamic braking, whenever there is a variation in the speed of generator 10. Accordingly, regulator circuit 55 is operative to limit the motor armature current during the period required for the engine speed to be reduced from what it was when the dynamic braking was actuated to the lower speed at which the control excitation settings had been made.

In operation therefore, when the potential drop between tap 58 and terminal 49 of braking resistance 18, due to the motor armature current therein, exceeds the magnitude of the reference voltage, current $I_{ef_2}$ flows from tap 58 and through exciter field winding 25 in a direction which is operative to reduce the output of the exciter 20. For example, when as shown, the breakdown diode 57 is employed to provide the desired reference voltage, current flows in exciter field winding 25 when the potential drop between tap 58 and terminal 49 of braking resistance 18 exceeds the breakdown voltage of diode 57. Because generator 10 supplies excitation to the motor field winding 17, reduction in the generator output, as a result of the decreased output of exciter 20, causes a reduction in motor field excitation to thereby reduce the motor armature current.

During variations in the speed of generator 10 (during dynamic braking), capacitance 62 conducts to allow current flow through exciter field winding 25 from tap 58 to terminal 49 of braking resistance 18 to similarly reduce the output of exciter 20 and limit the motor armature current even though the potential drop between tap 58 and terminal 49 is less than the reference voltage. Capacitance 62, therefore, may be considered to be an anticipator element in that it provides for an opposing exciter field flux to be produced as soon as the motor armature current starts to increase rather than waiting for the potential drop between tap 58 and terminal 49 to build up to a value exceeding the reference voltage.

While only a preferred embodiment of this invention has been illustrated and described, many changes and modifications will occur to those skilled in the art. For example, although the system has been described in detail utilizing control of the excitation of an exciter to regulate the excitation of an exciter to regulate the excitation of the generator, it will be understood that the various differential windings may all be incorporated in the generator itself. It is, therefore, to be understood that the appended claims are intended to cover all such changes and modifications as fall within the true spirit and scope of the invention.

What I claim as new and desire to secure by Letters Patent of the United States is:

1. In a dynamic braking system wherein the output of a generator is connected to provide field excitation for a motor having its armature connected in a loop with a braking resistance means, a regulating circuit for limiting motor armature current comprising: means for establishing a voltage reference which is independent of said system; a motor field excitation control means connected in circuit with said voltage reference and being operative when energized to reduce the excitation supplied by said generator to said motor; means for deriving a voltage to motor armature current; means connecting said derived voltage across said voltage reference means so that said motor field excitation control means is energized when said derived voltage exceeds said voltage reference; and means providing a transient current by-pass path across said voltage reference so that said motor field excitation control means is energized when said derived voltage changes.

2. The regulating circuit of claim 1 wherein said means for establishing the voltage reference is a semiconductor breakdown diode.

3. The regulating circuit of claim 2 wherein said means providing the transient current by-pass includes a capacitance and a resistance connected in parallel with said breakdown diode.

4. In a dynamic braking control system wherein the output of a generator is connected to provide field excitation for a motor having its armature connected in a loop with a braking resistance means, a regulating network for limiting motor armature current comprising: means establishing a reference voltage whose magnitude is independent of the current in said system; means for deriving a voltage responsive to motor armature current; motor field excitation control means; means connecting said motor field excitation control means between said derived and reference voltages so that said control means is energized to control motor field excitation when said derived voltage exceeds said reference voltage; and means including a capacitance shunting said voltage reference to provide a transient current by-pass path allowing energization of said motor field excitation control means when said derived voltage changes.

5. The regulating network of claim 4 wherein said means establishing a reference voltage is a semiconductor breakdown diode device.

References Cited

UNITED STATES PATENTS

| 2,627,597 | 2/1953 | Johansson | 318—381 |
| 2,591,791 | 4/1952 | Dilworth | 318—154 |
| 2,929,983 | 3/1960 | Abell | 318—143 |

ORIS L. RADER, *Primary Examiner.*

THOMAS LYNCH, *Examiner.*

UNITED STATES PATENT OFFICE
CERTIFICATE OF CORRECTION

Patent No. 3,378,749  April 16, 1968

Clarence V. Cunningham

It is certified that error appears in the above identified patent and that said Letters Patent are hereby corrected as shown below:

Column 6, line 14, after "voltage" insert -- responsive --.

Signed and sealed this 19th day of August 1969.

(SEAL)
Attest:

Edward M. Fletcher, Jr.  WILLIAM E. SCHUYLER, JR.
Attesting Officer  Commissioner of Patents